United States Patent
Pinkstaff

[15] 3,692,037
[45] Sept. 19, 1972

[54] JET SENSOR DEVICE
[72] Inventor: Carlos D. Pinkstaff, Kalamazoo, Mich.
[73] Assignee: Parker-Hannifin Corporation, Cleveland, Ohio
[22] Filed: Aug. 28, 1970
[21] Appl. No.: 67,893

[52] U.S. Cl. .......................................... 137/83, 91/3
[51] Int. Cl. .......................... F15b 5/00, F15c 5/14
[58] Field of Search ....... 137/83; 91/3; 73/37.6, 37.7; 235/201 FS

[56] References Cited
UNITED STATES PATENTS

| | | |
|---|---|---|
| 2,725,221 | 11/1955 | Pontow.................137/604 X |
| 3,183,933 | 5/1965 | Whitlock...............137/604 X |
| 3,071,157 | 1/1963 | Robertson...................91/3 X |
| 2,813,535 | 11/1957 | Markey......................137/83 |
| 3,457,940 | 7/1969 | Kirk............................137/83 |

*Primary Examiner*—Alan Cohan
*Attorney*—Diller, Brown, Ramik & Holt

[57] ABSTRACT

This disclosure relates to a jet sensor having a clog preventing flow out from a sensing passage in a direction opposite to the normal direction of flow. The clog preventing flow is controlled by an orifice plug seated in the sensing passage.

3 Claims, 3 Drawing Figures

PATENTED SEP 19 1972　3,692,037

INVENTOR
CARLOS D. PINKSTAFF

By
Diller, Brown, Ramik & Holt
ATTORNEYS

JET SENSOR DEVICE

This invention relates in general to an improved jet sensor and more particular to a jet sensor having clog preventing means.

BACKGROUND OF THE INVENTION

The usual jet sensor has a sensing jet flow across a space or notch into a sensing passage. The jet flow may pick up foreign matter and direct same against the entrance to the sensing passage to clog the sensing passage. This changes the pressure in the sensing passage giving false readings.

SUMMARY OF THE INVENTION

This invention has to do with preventing clogging of the sensing passage. A reverse flow of fluid is constantly directed through the sensing passage opposite to normal pressure flow therethrough. This provides a constantly cleansing action at the entrance to the sensing passage.

The out-flow of fluid from the sensing passage as opposed to the normal in-flow of fluid still permits a sensing pressure to exist within the sensing passage which is variable and detectable when the normal sensing jet is interrupted.

Fluid flow through the sensing passage, particularly the clog preventing flow, is controlled by an orifice plug seated in the sensing passage. The orifice plug has a through orifice and a second orifice opening into the through orifice at an angle in a direction to effect out-flow against normal sensing jet flow. The angle and size of the second orifice may be varied in accordance with the sensing pressure requirements of the particular sensor.

With the above and other objects in view that will hereinafter appear, the nature of the invention will be more clearly understood by reference to the following detailed description, the appended claimed subject matter, and the several views illustrated in the accompanying drawing.

Figure 1:
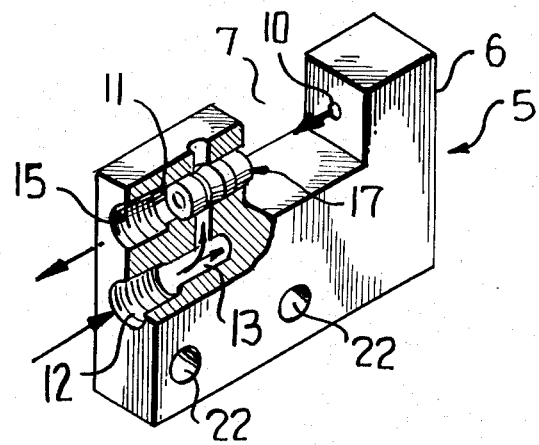
FIG. 1 is a perspective view with parts broken away of a jet sensor in accordance with this invention.
Figure 2:
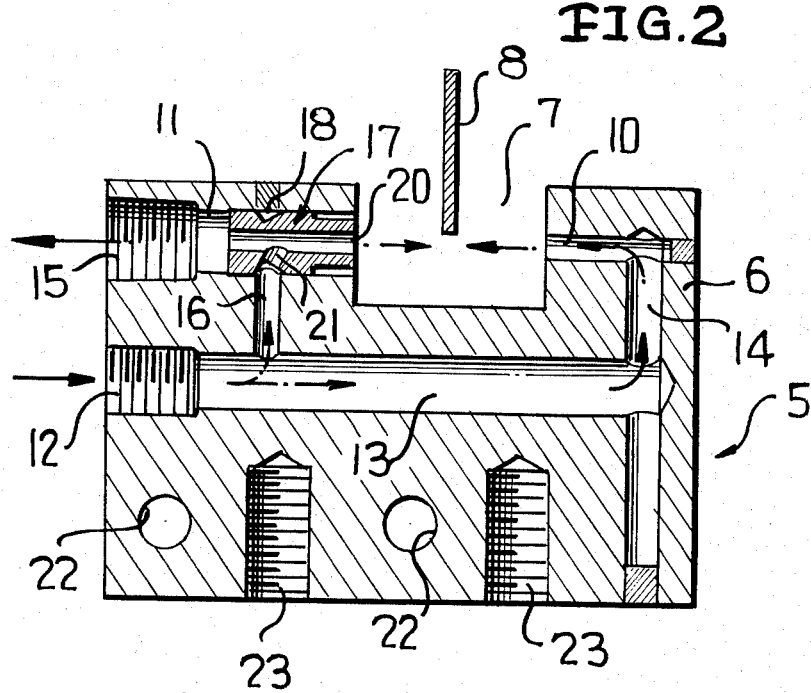
FIG. 2 is an enlarged longitudinal sectional view showing the sensor construction.
Figure 3:
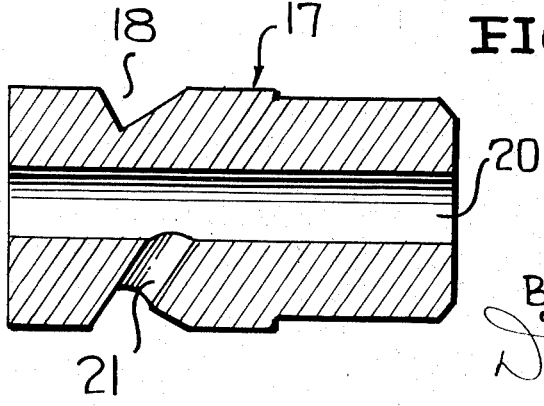
FIG. 3 is an enlarged axial sectional view through the orifice plug.

In FIGS. 1 and 2 there is illustrated a jet sensor 5 including a body 6 defining a sensing space or notch 7 through which work 8 to be sensed passes. A supply passage 10 directs a jet flow across notch 8 to a sensing passage 11.

Fluid enters body 6 through supply port 12, flows through passage 13, into passage 14 and then to passage 10. Passage 11 opens into sensing port 15 which will be connected to conventional pressure indicating and sensing control means (not shown).

Jet sensor 5 additionally includes a second supply passage 16 opening into sensing passage 11 for diverting part of fluid from passage 13 into sensing passage 11 for effecting a constant fluid out-flow from sensing passage 11 into notch 7. As a result all fluid flow is out-flow so that no clogging material can be externally picked up and plug any passage to give incorrect readings.

Flow through sensing passage 11 is finely controlled by orifice plug 17 seated in sensing passage 11 adjacent notch 7. Orifice plug 17 snugly fits sensing passage 11 and has an exterior peripheral passage 18 receiving flow from branch supply passage 16. Orifice plug 17 has an axial through orifice 20 into which a second orifice 21 extending inwardly from peripheral passage 18, opens.

Orifice 21 has an axis at an angle on the order of 60° to axis of through orifice 20 generally opposing normal flow into orifice 20. An angle of 62° has provided optimum results. Flow into orifice 21 from peripheral passage 18 is enhanced by one wall of passage 18 being normal to the axis of orifice 21.

During the use of sensor 5 there is constant out-flow from supply passage 10 through orifice 20 so that neither can pick up dirt from the exterior and become plugged. However, a constant sensing control pressure will exist in sensing port 15. When jet from supply passage 10 is interrupted by work 8, pressure in sensing port 15 will be varied in the normal manner.

Supply passage 10 and through orifice 20 may be of the same size with second orifice 21 being definitely smaller. Passages 13, 14 and 16 will be of sufficient sizes to assure adequate flow to passage 10 and orifice 21.

Body 6 will have conventional mounting means such as bores 22 or threaded bores 23.

Orifice plug 17 is readily replaceable whereby the sensing characteristics of the sensor may be readily varied. Variables in orifice plugs include the size of orifice 21 and the angle thereof to orifice 20.

Although only a preferred embodiment of the jet sensor has been disclosed, it is to be understood that minor variations may be made therein without departing from the spirit and scope of the invention as defined by the appended claims.

I claim:

1. A jet sensor comprising a notched body, a first supply passage in said body opening into the notch in said body, a sensing passage in said body opening from said notch in alignment with said first supply passage for normally receiving a sensing jet of fluid from said first supply passage across said notch, an orifice plug removably seated in said sensing passage adjacent said notch and having a through orifice in part defining a fluid flow path through said sensing passage, and a second supply passage in said body for directing a sensing passage clog preventing flow into said sensing passage, said orifice plug having an external peripheral flow passage aligned with said second supply passage for receiving clog preventing fluid flow therefrom and a second orifice extending from said peripheral flow passage into said through orifice in angular relation thereto and generally facing said first supply passage for directing said clog preventing flow in positive opposing relation to normal sensing flow of fluid through said sensing passage from said first supply passage across said notch; said second supply passage, said peripheral flow passage and said second orifices being of sizes to assure said clog preventing flow being sufficiently great to constantly flow into said notch.

2. The jet sensor of claim 1 wherein said body includes a wall, said sensing passage and said first supply passage opening through said wall, said second supply passage being in communication with said first supply passage for receiving fluid therefrom, and the path of fluid flow within said body to said sensing passage through said second supply passage being shorter than the path of flow of sensing fluid through said first supply passage to said notch.

3. The jet sensor of claim 1 wherein said second orifice is of a reduced cross sectional area as compared to said through orifice.

* * * * *